United States Patent [19]
von Behrens et al.

[11] 3,871,770
[45] Mar. 18, 1975

[54] HYDRODYNAMIC FOCUSING METHOD AND APPARATUS

[75] Inventors: Wieland E. von Behrens; Gordon C. Oates, both of Seattle, Wash.

[73] Assignee: Nuclear Data, Inc., Palatine, Ill.

[22] Filed: June 4, 1973

[21] Appl. No.: 366,401

[52] U.S. Cl........ 356/103, 250/222 PC, 324/71 CP, 356/39, 356/208
[51] Int. Cl. .................................. G01n 21/26
[58] Field of Search ....... 356/39, 72, 103, 196, 208, 356/246; 324/71 CP; 250/222 PC, 576

[56] References Cited
UNITED STATES PATENTS
3,661,460  5/1972  Elking et al..................... 356/208 X
3,662,176  5/1972  Kamentsky et al. ....... 250/222 PC X
3,692,410  9/1972  Jurany et al...................... 356/72 X Primary Examiner—Ronald L. Wibert
Assistant Examiner—Matthew W. Koren
Attorney, Agent, or Firm—Kinzer, Plyer, Dorn & McEachran

[57] ABSTRACT

A hydrodynamic focusing method and apparatus for passing particles, such as blood cells, in monofile through a narrowly defined geometric path which may include various sensing zones. The particles are analyzed in the sensing zones by the use of various principles including the scattering or absorbance of white, monochromatic, or laser light, light-induced cell fluorescense, ultrasound and current conduction.

12 Claims, 6 Drawing Figures

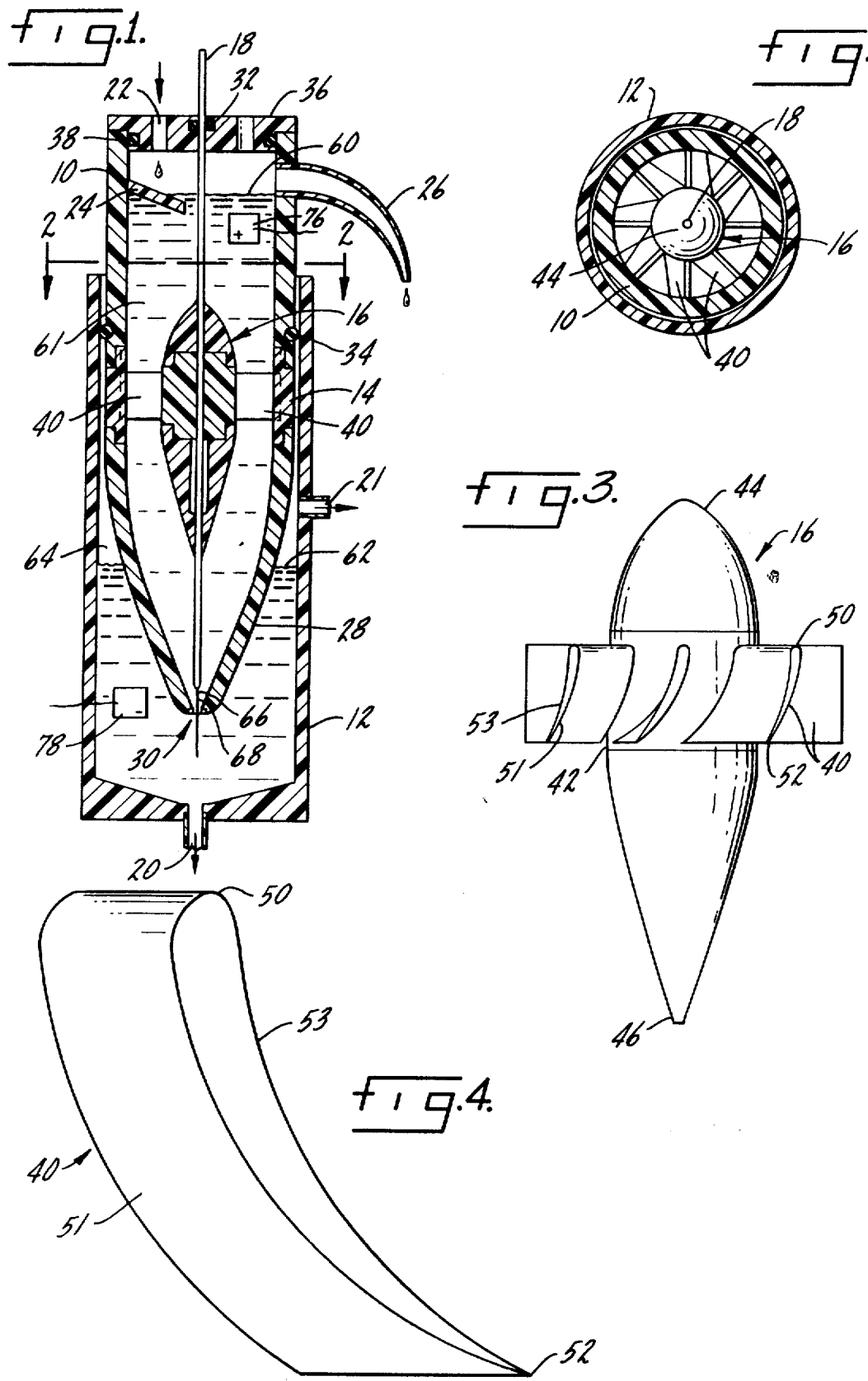

HYDRODYNAMIC FOCUSING METHOD AND APPARATUS

BACKGROUND OF THE INVENTION

The present invention relates to the field of particle sizing and analysis and more particularly to a method and device for hydrodynamic focusing for the counting, sizing and analysis of cellular elements in blood samples.

The theoretical requirements for achieving high particle size resolution for automated counting of particles of the order of size of mammalian blood cells involve bringing the particles into a very precisely defined geometric relationship to any one of various sensing zones. Monitoring occuring in various sensing zones may also require very precise timing.

The order of resolution attainable with the various sensing zones available, such as current conduction change, scattering or absorbance of white, monochromatic or laser light, light-induced cell fluorescence, and ultrasound, varies directly with the degree to which these requirements are met. In general the cost of the instrument and the labor involved in the sizing method increases rapidly with the increase in resolution. For example the high resolution attainable with the electron microscope is achieved only at a great cost. The electron microscope approach to particle sizing locates the object in a very precise focal plane but the cost of automating thin procedure and associated data analysis is prohibitive.

Some of the conventional particle sizing systems attempt to create a precisely defined geometric relationship in various sensing zones by contracting the overall tube shape of a sample delivery tube in order to increase the axial velocity and hence decrease the sample cross section. This leads to a long sample stream that developes flow instabilities and consequently causes an unwanted movement of the sample stream in the measurement section. Conventional particle sizing systems also use a horizontally supplied file of particles without suitable stabilizing means that leads to difficulties in the accurate focusing of the stream because of buoyancy effects brought about by the difference in density of the sample and the surrounding fluid of the devices.

It is very desirable to implement a particle sizing system that is relatively low in cost, simplifies the associated data analysis equipment and which may be automated. More particularly, it is desirable to have a focusing device for a sizing system that provides a monofile of very small particles through a narrowly defined geometric path that enables multiparameter discriminant analysis of cell populations in a single dilution unattainable with conventional systems.

SUMMARY OF THE INVENTION

It is a principal object of the invention to provide an improved method and apparatus for hydrodynamic focusing of particles such as blood cells and to pass the particles through a narrowly defined geometric path located within various sensing zones.

A primary object is a method and apparatus for hydrodynamic focusing and particle analysis that utilizes spiral hydrodynamic techniques to stabilize the particle flow and increase resolution with resultant data analysis efficiency.

Another object is a method and apparatus for hydrodynamic focusing that includes passing the particle sample suspension within a more or less particle free sheath of fluid through the sensing zone.

Another object is a method and apparatus for multiparameter discriminant analysis of cell populations and of each cell in a single dilution.

Another object is a method and apparatus for hydrodynamic focusing that passes the particles of the sample in monofile in a substantially vertical manner through a narrowly defined geometric path.

Another object is a hydrodynamic focusing device that causes the sample suspension to flow in a narrowly defined geometric path that simplifies data analysis and sensing zone equipment and requirements.

Another object is a hydrodynamic focusing method and device exibiting a high degree of focusing that will greatly enhance the precision of present day electronic counting systems such as automated computer data analysis.

Other objects will appear from time to time in the ensuing specification, drawings and claims.

BRIEF DESCRIPTION OF THE DRAWINGS

FIG. 1 is a sectional view of the preferred embodiment of the hydrodynamic focusing apparatus;

FIG. 2 is a sectional view of the hydrodynamic focusing apparatus taken along line 2—2 of FIG. 1;

FIG. 3 is a side view of the spiraling unit or stator assembly;

FIG. 4 is a detailed view of a stator blade of the stator assembly of FIG. 3; as viewed from the surface of the streamlined center body of the assembly;

DESCRIPTION OF THE PREFERRED EMBODIMENTS

Figure 5:
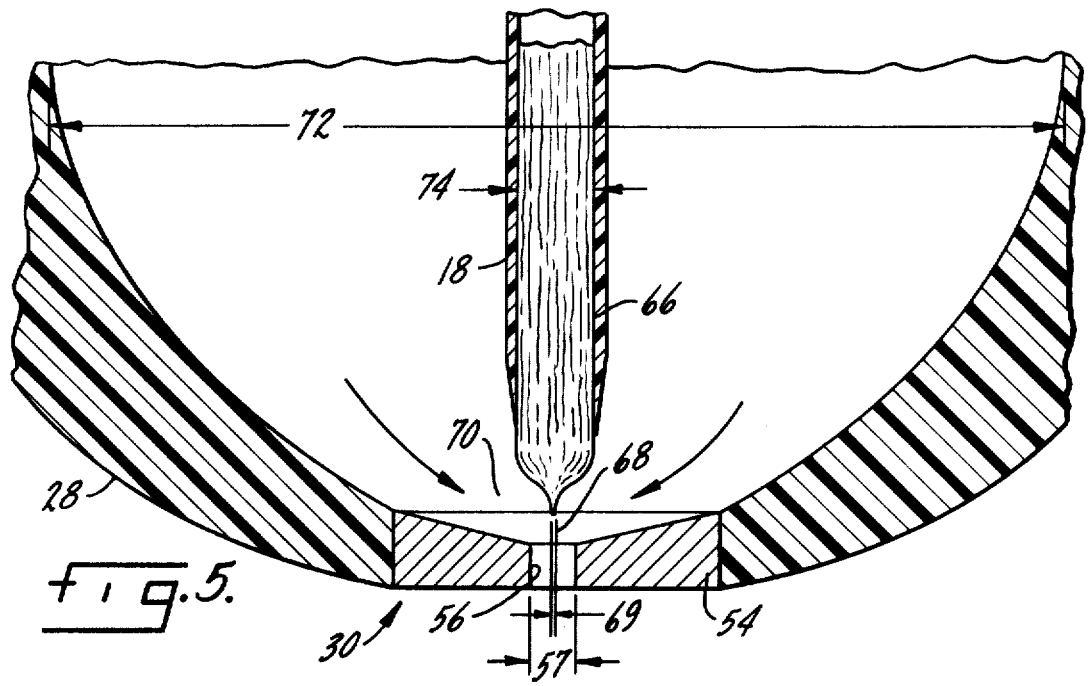
FIG. 5 is an enlarged fragmentary view of a portion of the hydrodynamic focusing apparatus of FIG. 1.

The hydrodynamic focusing apparatus of FIGS. 1 through 6 includes an upper housing 10 positioned in a lower housing 12. Positioned within the upper housing 10 by collar mounting means 14 is a spiraling unit or stator assembly 16. A sample delivery tube 18 extends through the upper housing 10 and the spiraling unit 16.

The lower housing 12 includes two outlets 20 and 21 which may be connected to associated equipment not shown such as a vacuum pump which will be discussed in detail hereinafter. The upper housing 10 includes a fluid inlet 22 at its uppermost portion and plate deflection means 24 below the inlet 22 both of whose functions will be explained in detail hereinafter. Overflow means 26 is also provided in the upper portion of housing 10. The bottom most portion of the upper housing 10 includes a tapered nose portion 28 with orifice means 30 located at the tip of the nose portion 28 shown in more detail in FIGS. 5 and 6.

Pressure sealing means may be provided at such locations as at 32 where the sample delivery tube 18 passes through the top of housing 10 and at 34 between the upper and lower housings 10 and 12. The upper housing may include a removable cover portion 36 and sealing means 38 are provided between the cover 36 and the housing 10.

The spiraling unit or stator assembly 16, shown in detail in FIGS. 2 and 3 includes a plurality of blades 40 attached to the core portion 42 of the spiraling unit. The spiraling unit 16 may include eight such blades 40 as this number has been found suitable to practice the method and teachings of this invention. The core 42 of the spiraling unit has a stream-lined or bullet shape with tapered nose sections 44 and 46 at both ends of the core portion 42. The blades 40 are mounted around the middle section of the core 42 which is approximately its point of greatest diameter.

Each of the blades 40, shows in detail in FIG. 4, is formed with a suction surface 51 and a pressure surface 53. The blade surfaces terminates with a leading edge 50 and a trailing edge 52. The leading edge 50 is somewhat rounded whereas the trailing edge 52 is more pronounced and sharp. The contour of the blades 40 can be seen in the top sectional view of the device in FIG. 2. Each of the surfaces 51 and 53 of blades 40 approximates a segment of the surface of a cone. However, these two cones are not co-axial.

The upper housing 10, lower housing 12, spiraling unit 16 and its blades 40 may all be fabricated from plastic although other electrically inert materials such as glass are suitable.

Figure 6:
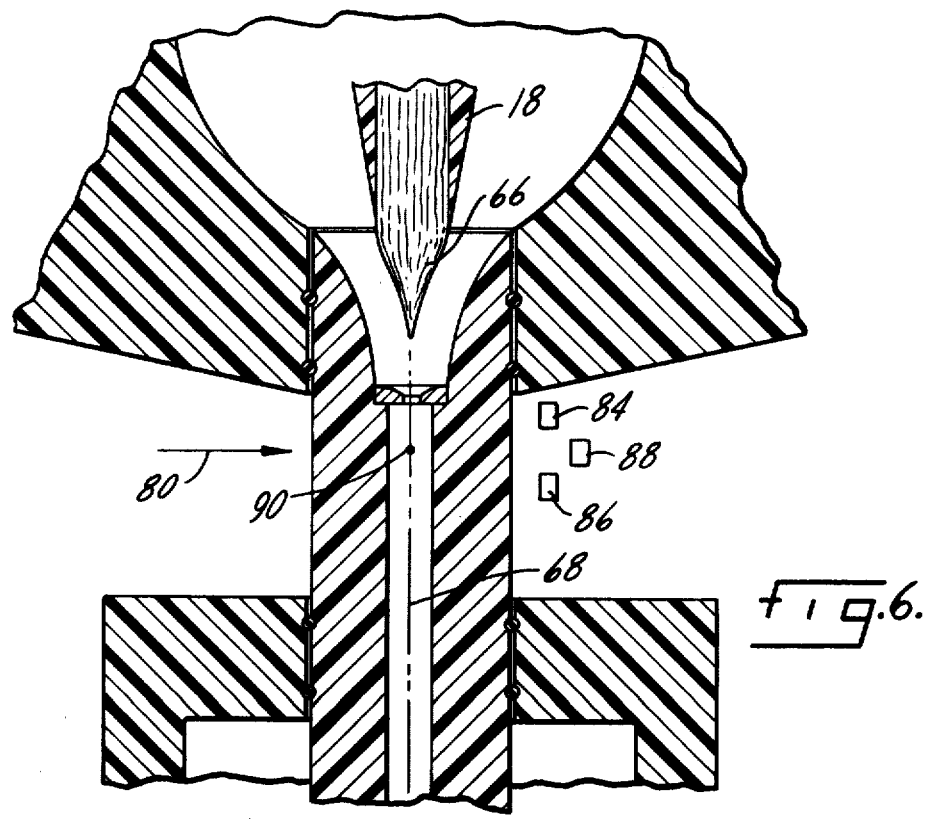
FIG. 6 is an enlarged fragmentary view of the sensing portion of another preferred embodiment of the hydrodynamic focusing apparatus; the portions of the apparatus not shown are essentially the same as those shown in FIG. 1.

The orifice means 30, see FIGS. 5 and 6, located at the tip of the nose section 28 may include a jewel orifice 54 whose opening 56 may be on the order of 100 micrometers. The jewel orifice 54 may be diamond or sapphire which may be cemented or otherwise suitably fastened to the material of the nose section 28 of the upper housing 10.

In operation, a fluid or also possibly a gas is introduced at the inlet 22 with vacuum pressure being applied to the lower chamber 12 at the outlets 20 and 21. The fluid then moves in a generally vertical path through the upper housing 10, through the orifice 30 and down through the lower housing 12 exiting through the lower outlet 20. The rate of flow of the fluid at 22 and the vacuum pressure at outlets 20 and 21 are adjusted for suitable operation as will be explained in detail hereinafter. The overflow 26 provides a stable fluid level shown as 60 in the upper housing or chamber 10. The outlet vacuum pressure system (not shown) is adjusted such that the fluid level 62 in the lower housing or chamber 12 is stablized at a suitable point above the nose section 28 of the housing 10. A gas bubble trap shown generally at 64 is provided at a vacuum pressure equal to that at the outlets 20 and 21, to allow gas bubbles which might form in the lower chamber to escape to this region. The outer wall of the nose section 28 is smoothly shaped to allow the bubbles to escape through the trap 64. Gas bubbles forming in the upper chamber can escape directly upwards.

As the fluid from inlet 22 passes the blades 40 of the spiraling unit 16, the fluid is rotated or spiraled to induce inward flow in the end wall boundary layer. This inward flow leads to an extremely large effective contraction rate at the orifice 30. The result is that an enormous contraction of the central stream cross sectional area occurs in a very short distance.

The blood sample with various cell populations, or the desired particles to be analyzed, are delivered into the sample tube 18. The sample delivery system, which is not shown, might be manual or may be under very precisely automated control. In any event the sample passes downward through the tube 18 through the center of the spiraling unit 16 and leaves the sample delivery tube at its termination which may be in the range of several millimeters to one centimeter from the orifice 30.

The rate of flow of the sample through the delivery tube 18 is also suitable controlled. Immediately proximal to the orifice 30, the sample stream, shown as 66 in FIGS. 1 and 5, is seen to contract at 68 by an enormous factor and to become invisibly narrow. The large contraction ratio of the sample stream at 66 to 68, is caused by the secondary flow effects of fluid 61. The narrowed sample stream at 68 is then a monofile of very small particles passing through the narrowly defined geometric path of the orifice aperture 56. Beyond the orifice, the stream persists as a fast moving jet with uniform diameter for distances beyond several centimeters to provide adequate sensing zones.

The contraction region is shown as 70 in FIG. 5. The ratio of the diameter 57 of the orifice aperture 56 to the sample stream diameter 69 at 68 represents the ratio of the diameter of the sample and secondary flow fluids respectively. The ratio of stream diameters above the orifice region 40 may be represented as the ratio of the diameter 72 of the nose cone 28 and the diameter 74 of the sample stream. The contraction ratio of the sample stream from 66 to 68 and therefore the maintainance of the monofile of particles may be optomized by the control of these two ratios.

With the monofile sample stream passing through the orifice means 30 and continuing past the orifice in a monofile, various sensing zones or measuring stages for analysis may be provided as shown in FIGS. 1 and 6. If a positive plate 76 and a negative plate 78 are positioned within the liquid 61, as the particles pass through the jewel orifice 54, a change in current flow will result with the size of the particle determining the magnitude of this change in current flow. This change in current flow can then be used to determine the number of particles passing through the orifice and secondly to give an accurate representation of the size of the particles.

A laser sensing or analysis zone may also be provided with a collimated laser beam 80 directed perpendicular to the monofile sample stream 68 with suitable sensing means such as photosensor 88 located on the opposite side of the monofile. Scatter photosensors 84 and 86 and transmission photosensor 88 are provided to measure the received scattered light of the laser beam 80 and the direct received light. As the particles such as 90 in monofile 68 interrupt the laser beam, the laser beam 80 will tend to be scattered and the degree of scattering will give a representation of various parameters of the particles. The scattering of the laser beam 80 can give additional information in addition to information gained from the change in current flow when the particle passes through the jewel orifice 54. For example the laser sensing means may identify whether the particles are opaque or translucent to various degrees of resolution.

Subsequent stages of sensing areas or zones using the scattering or absorbence of white or monochromatic light, light-induced cell fluorescence, or ultrasound techniques will give additional information about the properties of the particles. Any one of the various sensing zone devices or combination thereof might be incorporated in a given system dependent upon the resolution and properties of the particles to be analyzed.

The hydrodynamic focusing device of FIGS. 1 through 6 utilizes spiral hydrodynamic focusing for passing particles from a suspension in gas or fluid in monofile through a narrowly defined geometric path located within various sensing zones. The use of a secondary fluid flow for focusing exploits the tendency of a rotating fluid to induce inward flow in the end wall boundry layer. This inward flow leads to an effective contraction rate at the exit orifice that is extremely large resulting in an enormous contraction of the cross-sectional area of the sample stream. As a result the sample stream length preceding the measurement station may be kept to a minimum with consequent accurate location of the sample With with suitable geometric ratio of the structures involved, a monofile of particles results with corresponding simplified data analysis. The induced swirl, created by the free vortex blading upstream of the sample injection area leads to a spinning central core of fluid. This central core, in which the sample stream is embedded, is consequently vortex stabilized resulting in a lengthened stable sample stream. Accurate focusing of the sample stream is also enhanced by the vertical streaming of the sample eliminating buoyancy effects brought about because of the difference in density of the sample and the surrounding fluid. Multi-parameter discriminant analysis of cell populations in a single dilution are possible due to the resulting monofile of particles in a sample stream of such length and accuracy that multiple sensing zones may be utilized. The sprial hydrodynamic focusing technique of the present invention causes the sample suspension to flow more or less within a particle free sheath of fluid through the sensing zone in a narrowly defined geometric path.

Whereas the preferred form of the invention has been shown and described herein, it should be realized that there may be many modifications, substitutions, and alterations thereto without departing from the teachings of this invention.

We claim:

1. A method for the hydrodynamic focusing of particles into a monofile including the steps of introducing a sample suspension, in an axial direction, into a fluid medium having a spiral flow pattern, passing the particles of the sample in monofile through a narrowly defined geometric path, and monitoring the particles in the monofile as they pass through a sensing zone.

2. The method of claim 1 further characterized in that said sensing zone includes means for measuring the change in electrical current flow in the fluid medium as particles in the monofile pass through the narrowly defined geometric path.

3. The method of claim 1 further characterized in that said sensing zone includes means for laser analysis of the particles in the monofile.

4. The method of claim 3 further characterized in that said laser analysis means includes scatter monitoring means and direct receiving monitoring means.

5. The method of claim 1 further characterized in that said spiral flow pattern of the fluid medium contracts the sample suspension into a monofile.

6. The method of claim 5 further characterized in that said contraction of the sample suspension takes place prior to passing through the sensing zone.

7. In a particle sensing apparatus, a housing, means for introducing a particle suspension sample into the housing, a fluid medium within the housing and means within the housing for creating a spiral flow pattern for said fluid medium, a sensing zone within the housing for use in measuring certain characteristics of the particle suspension sample, said sensing zone including a narrow orifice, means for directing said particle fluid medium contracting sample through said fluid medium and through said orifice, with the spiral flow pattern of said fluid medium contracting said particle suspension sample into a monofile prior to passing through said orifice.

8. The structure of claim 7 further characterized in that the means for creating a spiral flow pattern include a plurality of blades positioned within said housing.

9. The structure of claim 8 further characterized by a streamlined center body within the housing, said blades extending outwardly from said center body.

10. The structure of claim 9 further characterized by a conduit for said particle suspension sample positioned within said center bodyy.

11. The structure of claim 10 further characterized in that said conduit terminates short of said orifice.

12. The structure of claim 7 further characterized in that said particle suspension sample flows in a substantially vertical direction through said orifice.

* * * * *